United States Patent [19]

Nickol et al.

[11] Patent Number: 4,491,391
[45] Date of Patent: Jan. 1, 1985

[54] LIQUID CRYSTAL DISPLAY DEVICE WITH VISIBLY IMPERCEPTABLE SPACERS

[75] Inventors: Friedrich W. Nickol, Eppstein; Harald Perthes, Sulzbach, both of Fed. Rep. of Germany

[73] Assignee: VDO Adolf Schindling AG, Frankfurt am Main, Fed. Rep. of Germany

[21] Appl. No.: 348,627

[22] Filed: Feb. 16, 1982

[30] Foreign Application Priority Data

Feb. 27, 1981 [DE] Fed. Rep. of Germany ....... 3107456

[51] Int. Cl.³ .............................................. G02F 1/133
[52] U.S. Cl. ................................. 350/339 R; 350/344; 428/1
[58] Field of Search ................. 350/344, 339 F; 428/1

[56] References Cited

U.S. PATENT DOCUMENTS

| 3,840,695 | 10/1974 | Fischer | 350/334 X |
| 4,231,034 | 10/1980 | Bechteler | 350/344 X |
| 4,248,502 | 2/1981 | Bechteler et al. | 350/399 R X |
| 4,249,800 | 2/1981 | Spruijt | 350/344 X |
| 4,341,445 | 7/1982 | Matsuyama et al. | 350/344 |

FOREIGN PATENT DOCUMENTS 25035 2/1980 Japan .................................. 350/344

Primary Examiner—John K. Corbin
Assistant Examiner—David Lewis
Attorney, Agent, or Firm—Martin A. Farber

[57] ABSTRACT

A display device for displaying light characters against a dark background, particularly a liquid-crystal display. It has a fluid which can be switched between two optically different states located between two support plates (1, 2) which are parallel to each other. On one of the facing surfaces of the support plates there is applied an insulating layer of fixer which contains the spacer elements (7). The support plates (1, 2) are maintained at a given distance from each other by these spacers (7). Furthermore, a polarizer (11, 12) is associated with each support plate (1, 2). In order to assure a strong contrast between the character and its background with precise maintenance of the distance between the support plates (1, 2), the insulating layer of fixer completely covers the support plate (1) and the spacer elements (7) consist of a material of dark color.

17 Claims, 2 Drawing Figures

LIQUID CRYSTAL DISPLAY DEVICE WITH VISIBLY IMPERCEPTABLE SPACERS

The present invention relates to a display device for displaying light characters against a dark background, particularly liquid-crystal displays, having a fluid which can be switched between two optically different states and is arranged between two support plates which are parallel to each other with an insulating layer of a fixer applied to one of the facing surfaces of the support plates, said layer containing spacer elements by which the support plates are held at a given distance apart from each other, and with a polarizer associated with each support plate.

In such display devices it is known to develop the spacer elements of a transparent material. This has the disadvantage that the light which strikes the display device is dispersed in the spacer elements and thus the dark background of the light characters is brightened. In this way, the contrast between the characters and their background is substantially reduced, as a result of which the ease of recognition of the characters is also reduced.

The object of the present invention is therefore to provide a display device in accordance with the introductory paragraph which, with exact maintenance of the distance between the support plates, assures a strong contrast between the characters and their background.

This object is achieved in accordance with the invention in the manner that the foregoing insulating layer completely covers the support plate (1) and that the spacer elements (7) comprise a material of dark color. Due to the fact that the insulating layer completely covers the support plate, a uniform distance between the support plates over their entire surface is assured. While in the case of the prior-art, the remaining light entering through the polarizers is scattered by the transparent spacer elements and the background of the characters is thus brightened, the dark spacer elements absorb this light in the case of the invention. In this way the background of the characters remains a deep dark color and produces a strong contrast between itself and the light characters. The spacer elements may be of a dark blue or brown color or even black.

The spacer elements (7) are preferably at a distance spaced apart from each other greater than their diameter. The spacer elements (7) preferably have a diameter of <100 μm and are arranged on the support plate (1) with a distribution equal to or less than one to two spacer elements (7) per square millimeter. This has the advantage that, despite the dark color of the spacer elements, there is a practically imperceptible reduction of the brightness of the characters as compared with transparent spacer elements.

The spacer elements (7) may be spherical and made of glass.

Since the spacer elements are bound in the insulating (or fixer) layer, they are stationary and cannot settle out in the lower region of the display device thus becoming ineffective for a large part of the display device when the device is, for instance, standing vertically.

Damage to the orientation layers, for instance, caused by vibration of the display and thus striking of the spacer elements against the orientation layers is also avoided by the fact that the spacer elements are bound in the insulating layer.

If the display device has a surface electrode which completely covers one support plate, then the surface electrode can serve as fixing layer for the spacer elements.

Similarly, an insulating layer (6) which covers electrodes arranged on the support plates can serve as fixing layer for the spacer elements (7).

Another alternative is the use of an anti-reflection layer which completely covers one support plate as a fixing layer for the spacer elements.

Finally, it is also possible to use an orientation layer which completely covers a support plate as a insulating layer for the spacer elements.

These developments in which layers which are already present are used also as insulating layers have the advantage that, on the one hand, no special additional insulating layer is required while, on the other hand, no special additional operation for applying said insulating layer is required.

In a display device in which an electrode constructed of separately controllable electrode segments is arranged on a support plate, it is particularly advantageous if the insulating layer has recesses which correspond to the electrode segments. In this way even the reduction in brightness of the characters which occurs as compared with transparent spacer elements, but is not perceptible in practice, is avoided.

BRIEF DESCRIPTION OF THE DRAWINGS

A preferred embodiment of the invention is shown in the figures of the drawing wherein.

DETAILED DESCRIPTION

Figure 1:
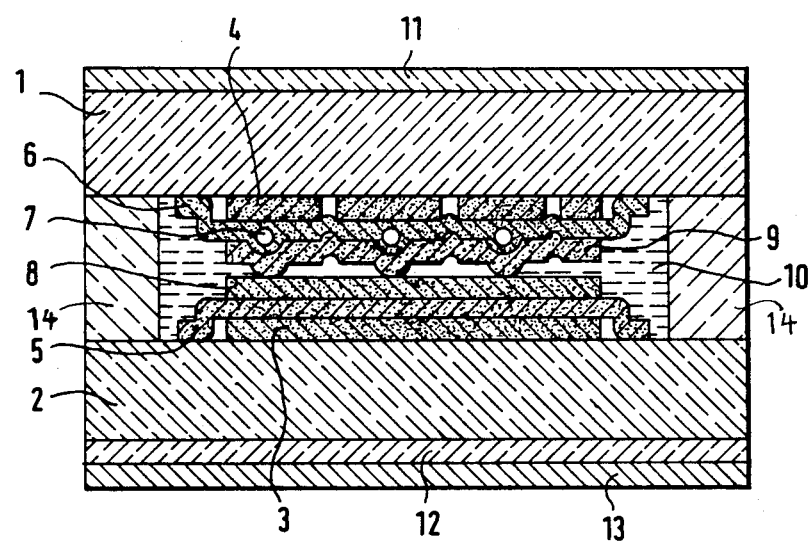
FIG. 1 is a sectional view of the display device of the invention.

The display device shown in cross section in FIG. 1 of the drawing is a liquid-crystal display with two support plates 1 and 2, spaced from each other, which are made of glass and form with each other a cell which is closed off from the outside by a side wall 14 surrounding the entire chamber.

Electrodes are arranged on the facing surfaces of the support plates 1 and 2; the electrode 3 which is present on the support plate 2 comprises a single part while the electrode 4 which is arranged on the support plate 1 is made of individually controllable character-forming electrode segments.

Both of the electrodes 3 and 4 are covered by an insulating layer, the insulating layer 5 which is arranged on the electrode 3 having no spacer elements.

The insulating layer 6 arranged on the electrode 4 contains spacer elements 7 which insure that the two support plates 1 and 2 are held at the same distance from each other over their entire surface.

The spacer elements 7, which are made of black light-absorbing glass beads, are arranged at a distance from each other which is greater than their diameter.

The insulating layers 5 and 6 are covered by orientation layers 8 and 9 while the cell formed by the support plates 1 and 2 is filled by a liquid-crystal substance 10 in the chamber between the plates.

Polarizers 11 and 12 are furthermore provided on the outer sides of the support plates 1 and 2, the polarizer 12 also bearing a reflecting 13.

Figure 2:
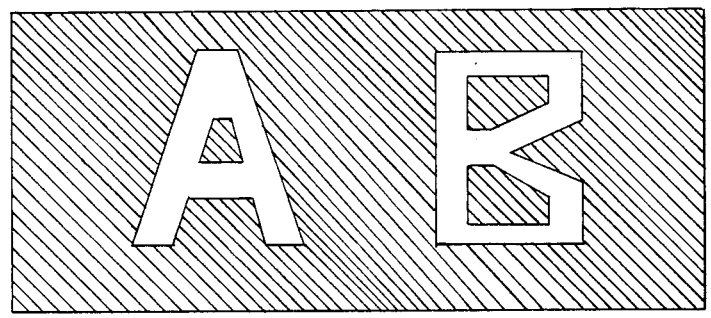
FIG. 2 is a plan view of the device of FIG. 1 demonstrating the display of light legends on a dark background.

The polarizers 11 and 12 are so directed that when the electrodes 3 and 4 are not modulated an observer sees a dark display field and when the electrodes 3 and 4 are modulated he sees light characters which conform to the configuration of the modulated electrode segments of the electrode 4 against an otherwise dark background (FIG. 2).

The spacer elements 7 in addition to being of spherical shape may also be of any other suitable shape. It has been found that rod-shaped spacer elements can be readily introduced and are therefore preferably employed in accomplishing the objects of the invention.

While there is disclosed an embodiment of my invention, this embodiment is given by example only and not in a limiting sense.

We claim:

1. In a liquid crystal display device having light characters against a dark background, said device having a fluid which can be switched between two optically different states and is arranged between two support plates which are parallel to each other with a fixing layer applied to one of the facing surfaces of the support plates, wherein said fixing layer is an insulating layer containing spacer elements by which the support plates are held at a given distance apart from each other, and with a polarizer associated with each support plate, the improvement wherein the insulating layer substantially completely covers the corresponding said support plate, and the spacer elements comprise a light absorbing material of dark color, and wherein said spacer elements have a diameter less than 100 microns and are spaced apart from each other with spacings greater than said diameter with a distribution density less than two spacer elements per square millimeter thereby minimizing the diffusion of light on the dark background while being substantially imperceptible to a viewer of the display device.

2. The device according to claim 1, wherein
the spacer elements are disposed at a distance apart from each other greater than their diameter.

3. The device according to claim 2, wherein
the spacer elements have a diameter of less than 100 μm and are arranged on the corresponding support plate with a distribution at most equal to one to two spacer elements per square millimeter.

4. The device according to claim 1, wherein
said spacer elements are spherical.

5. The device according to claim 1, wherein
said spacer elements are made of glass.

6. The device according to claim 1, further comprising
a surface electrode contiguous to said insulating layer and covering said corresponding support plate.

7. The device according to claim 1, further comprising
electrodes arranged on each of said support plates, and wherein
said insulating layer completely covers the electrodes and the support plates.

8. The device according to claim 1, further wherein
said insulating layer is an anti-reflection layer which completely covers said corresponding support plate.

9. The device according to claim 1, further wherein
said insulating layer is an orientation layer which completely covers said corresponding support plate.

10. The device according to claim 1, in which an electrode comprising separately controllable electrode segments is arranged on said corresponding support plate, and wherein
the insulating layer is formed with recesses which correspond to said electrode segments.

11. The device according to claim 1, wherein
the insulating layer completely covers the corresponding support plate.

12. In a liquid crystal display device having light characters against a dark background, the device having two spaced-apart support plates, and an electrode structure supported thereon, the combination comprising:

spacers of a dark, light absorbing material; and a layer of optically transmissive material fixedly supporting said spacers relative to one of said support plates, and wherein said spacer elements have a diameter less than 100 microns and are spaced apart from each other with spacings greater than said diameter with a distribution density less than two spacer elements per square millimeter thereby minimizing the diffusion of light on the dark background while being substantially imperceptible to a viewer of the display device.

13. A device according to claim 12 wherein said layer encloses said electrode structure.

14. A device according to claim 13 further comprising
polarizers disposed on outer surfaces of said support plates.

15. A device according to claim 12 or 13 wherein said spacers are light absorbing glass beads.

16. A device according to claim 12 or 13 wherein said spacers are light absorbing glass rods.

17. A device according to claim 11 wherein
said spacers have a bead-like shape, and
said layer includes recesses corresponding to segments of said electrode structure.

* * * * *